(12) United States Patent
Mouri et al.

(10) Patent No.: US 7,219,159 B2
(45) Date of Patent: May 15, 2007

(54) PLURAL-ROUTES SEARCH METHOD AND NETWORK SYSTEM USING THE SAME

(75) Inventors: Tsunehito Mouri, Tokyo (JP); Osamu Nakazawa, Tokyo (JP); Hiroyuki Saito, Tokyo (JP); Akihito Shinozaki, Tokyo (JP); Sadayo Hirata, Yokohama (JP); Hirotoshi Yamada, Kawasaki (JP)

(73) Assignees: Fujitsu Limited, Tokyo (JP); NTT Communications Corporation, Tokyo (JP)

(*) Notice: Subject to any disclaimer, the term of this patent is extended or adjusted under 35 U.S.C. 154(b) by 524 days.

(21) Appl. No.: 10/144,400

(22) Filed: May 13, 2002

(65) Prior Publication Data

US 2003/0023751 A1 Jan. 30, 2003

(30) Foreign Application Priority Data

Jul. 11, 2001 (JP) .............................. 2001-210246

(51) Int. Cl.
*G06F 15/173* (2006.01)
*G06F 11/00* (2006.01)
*H04L 12/26* (2006.01)
*H04L 12/56* (2006.01)

(52) U.S. Cl. .................. 709/241; 370/238; 370/395.32
(58) Field of Classification Search ................ 709/224, 709/238, 241, 243, 244; 370/238, 395.31, 370/395.32, 400, 406, 241, 252, 253, 237, 370/232

See application file for complete search history.

(56) References Cited

U.S. PATENT DOCUMENTS

| | | | | |
|---|---|---|---|---|
| 5,317,566 A | * | 5/1994 | Joshi ........................... | 370/238 |
| 5,946,295 A | * | 8/1999 | Sofman et al. ............. | 370/228 |
| 5,963,546 A | * | 10/1999 | Shoji .......................... | 370/255 |
| 6,147,971 A | * | 11/2000 | Rochberger et al. ........ | 370/238 |
| 6,310,883 B1 | * | 10/2001 | Mann et al. ................. | 370/408 |
| 6,333,918 B1 | * | 12/2001 | Hummel ...................... | 370/238 |
| 6,370,119 B1 | * | 4/2002 | Basso et al. ................ | 370/252 |

(Continued)

FOREIGN PATENT DOCUMENTS

JP 05-046590 2/1993

OTHER PUBLICATIONS

J. David Claiborne. Mathematical Preliminaries for Computer Networking. ISBN 0-471-51062-9 May 1990. pp. 100-111.

*Primary Examiner*—Ario Etienne
*Assistant Examiner*—Gregory G. Todd
(74) *Attorney, Agent, or Firm*—Katten Muchin Rosenman LLP

(57) ABSTRACT

A searching method of a plurality of routes includes the steps of defining, as an X direction, one direction of a bidirectional transmission line connected to each of the plurality of nodes, and another direction as a Y direction; respecifying an initial node and a terminal node; searching a first shortest route extending from the specified initial node to the specified terminal node; searching a second shortest route for nodes connected to another transmission line in the X direction; searching a third shortest route extending from the specified initial node to the specified terminal node; searching a fourth shortest route for nodes connected to another transmission line in the Y direction; comparing the sum of the X group first route and second route with the sum of the Y group first route and second route; and determining the group having a smaller sum as an optimal route in the comparison.

12 Claims, 11 Drawing Sheets

U.S. PATENT DOCUMENTS

| | | | |
|---|---|---|---|
| 6,574,669 B1 * | 6/2003 | Weaver | 709/239 |
| 6,600,722 B1 * | 7/2003 | Tran et al. | 370/238 |
| 6,646,989 B1 * | 11/2003 | Khotimsky et al. | 370/238 |
| 6,667,958 B2 * | 12/2003 | Phan et al. | 370/238 |
| 7,042,846 B2 * | 5/2006 | Bauer | 370/238 |
| 2001/0017845 A1 * | 8/2001 | Bauer | 370/238 |
| 2002/0062388 A1 * | 5/2002 | Ogier et al. | 709/238 |

* cited by examiner

FIG. 6

SECTION INFORMATION TABLE

| No. | ATTRIBUTE |
|---|---|
| 1 | IDENTIFIER OF THIS OBJECT |
| 2 | SECTION NAME |
| 3 | SECTION NUMBER |
| 4 | SECTION DIRECTION (X DIRECTION, Y DIRECTION) |
| 5 | OBJECT/NON-OBJECT IDENTIFIER |
| 6 | USABLE TIME BAND |
| 7 | USER NAME |
| 8 | USER GROUP NAME |
| 9 | COUNTER OF THE NUMBER OF TIMES OF USE |
| 10 | USE TIME COUNTER |
| 11 | USE AMOUNT (BAND CAPACITY) |
| 12 | FAULT STATE |
| 13 | SETTING STATE OF THIS OBJECT |
| 14 | CONSTRUCTION STATE OF THIS OBJECT |
| 15 | SERVICE STATE OF THIS OBJECT |
| 16 | BAND LIST |
| 17 | A SIDE NODE NAME |
| 18 | A SIDE NODE ID |
| 19 | NODE IDENTIFIER OF A SIDE NODE |
| 20 | Z SIDE NODE NAME |
| 21 | Z SIDE NODE ID |
| 22 | NODE IDENTIFIER OF Z SIDE NODE |
| 23 | BAND USE INFORMATION LIST |
| 24 | ROUNDABOUT EX-IDENTIFIER |
| 25 | USE START TIME |
| 25 | USE END TIME |
| 26 | REGULATION INFORMATION LIST |

FIG. 7

NODE INFORMATION TABLE

| No. | ATTRIBUTE NAME |
|---|---|
| 1 | IDENTIFIER OF THIS OBJECT |
| 2 | NODE NAME |
| 3 | NODE NUMBER |
| 4 | OBJECT/NON-OBJECT IDENTIFIER |
| 5 | USABLE TIME BAND |
| 6 | USER NAME |
| 7 | USER GROUP NAME |
| 8 | USE TIME |
| 9 | USE AMOUNT |
| 10 | FAULT STATE |
| 11 | CONNECTION DESTINATION STATE |

FIG. 8

CONNECTION GROUP TABLE

| No. | ATTRIBUTE |
|---|---|
| 1 | IDENTIFIER OF THIS OBJECT |
| 2 | CONNECTION GROUP NAME |
| 3 | CONNECTION GROUP NUMBER |
| 4 | POSITIONAL INFORMATION |
| 5 | NODE LAYOUT ID LIST |
| 6 | CONNECTION SECTION LIST |

FIG. 9

ROUTE INFORMATION TABLE AFTER DETERMINED

| No. | ATTRIBUTE |
|---|---|
| 1 | IDENTIFIER OF THIS OBJECT |
| 2 | ROUTE INFORMATION NAME |
| 3 | ROUTE INFORMATION NUMBER |
| 4 | A SIDE NODE IDENTIFIER |
| 5 | Z SIDE NODE IDENTIFIER |
| 6 | 0 SYSTEM PASSING NODE INFORMATION LIST |
| 7 | 1 SYSTEM PASSING NODE INFORMATION LIST |

…

PLURAL-ROUTES SEARCH METHOD AND NETWORK SYSTEM USING THE SAME

BACKGROUND OF THE INVENTION

1. Field of the Invention

The present invention relates generally to a route search method, and, more particularly, to a method of raising the probability of searching a plurality of routes not by way of the same node, and to a network system to which the method is applied.

2. Description of the Related Art

In the case where a data communication is carried on in a network containing a plurality of nodes, for example, in a broadcasting network which transmits a picture signal (containing a voice), a plurality of broadcasting stations are connected to a transmission line as each node, and are configured so as to transmit the picture signal from a certain key station to another key station by way of the plurality of nodes.

Herein, in order to increase the reliability in a broadcast, the same picture signal is normally transmitted as a picture signal transmission from a certain one station to a reception station through a plurality of routes. Thus, the reception station switches faults in the routes to be transmitted through the one route into the picture signal to be transmitted through another route for reception, whereby it is possible to receive the picture signal without generating a disorder of the picture.

In order to ensure such an aspect, it is necessary that the plurality of routes have previously been set in a network under prescribed conditions prior to a start of the operation and also after the start of the operation. For this reason, a technique for searching a route to be set from the plurality of routes in the network comes to be required.

As a conventional technique for acquiring a route at the shortest distance out of all the routes linking from a certain initial node to a terminal node in the network, the Dijkstra method is well known. This method is, for example, an algorithm which introduces the most advantageous one route in an element by a matrix calculation with an element (distance, cost, or the like) in all the routes linking between the nodes as a matrix.

FIG. 1 is a diagram for explaining a concept of such the Dijkstra method, and as a step of searching the plurality of routes, a first shortest route is searched (a first shortest route search a) and succeedingly n pieces of remaining routes are searched (an n route search b).

That is, the Dijkstra method, in FIG. 1, registers a section between adjoining two nodes as an element, and a distance in section unit as an attribute. And, this algorithm calculates the distance between the sections linking all the adjacent nodes from a certain initial node, and then further calculates the distance linking all the adjacent nodes from respective adjacent nodes, and determines the shortest route in the distance of the sections linked up to the terminal node by repeating the above.

In the case where such the algorithm is applied, it is possible to present the one shortest route. However, in the case where the plurality of routes are necessary, there is a possibility that the nodes or sections are overlapped each other. FIG. 2 shows one example of the network, and in the case where a part of the nodes or sections is unusable, there is a possibility that the plurality of routes are unusable.

That is, in FIG. 2, a network configured by a node A to a node I is assumed. The initial node is designated as the node A and the terminal node is designated as the node I, and in the case where the first route to be searched by the Dijkstra method is A B E H I, a second route is bound to pass by way of the same node with the first route. Accordingly, in the case where the common node is unusable, either route is unusable.

Furthermore, when the first route is not treated as an object (is set so as not to pass the same node or same section) and the second route and forward are acquired, as the other than the shortest route has to be used, the second route and forward are a devious route, or are not found, and then there is a possibility that the use in the plurality of shortest routes is impossible. In this manner, in the case of the Dijkstra method, a difference in conditions between the first route and the second route is increased.

SUMMARY OF THE INVENTION

It is therefore an object of the present invention to provide a route search method which raises the possibility of searching the plurality of routes as optimal as possible so as not to pass the same node; and a network system to which this method is adapted.

It is another object of the present invention to provide a route search method which avoids the danger incapable of using the network due to faults, etc. of the nodes or sections, and searches the plurality of routes with high reliability.

In order to solve the above problems, according to the aspect of the present invention there is provided A method of searching a plurality of routes linking from an initial node to a terminal node in a network linking a plurality of nodes, includes the steps of: defining, as an X direction, one direction of a bidirectional transmission line connected to each of the plurality of nodes, and defining another direction as a Y direction; specifying an initial node and a terminal node; searching a first shortest route extending from the specified initial node to the specified terminal node, connected by nodes connected to a transmission line in the X direction, with the first shortest route being set as an X group first route; searching a second shortest route for nodes connected to another transmission line in the X direction, excepting the nodes on the X-direction first route, with the second shortest route being set as an X group second route; searching a third shortest route extending from the specified initial node to the specified terminal node, connected by nodes connected to a transmission line in the Y direction, with the third shortest route being set as a Y group first route; searching a fourth shortest route for nodes connected to another transmission line in the Y direction, excepting the nodes on the Y direction first route, with the fourth shortest route being set as a Y group second route; comparing the sum of the X group first route and second route with the sum of the Y group first route and second route; and determining the group having a smaller sum as an optimal route in the comparison.

Preferably, respective searches of the X group first route, the X group second route, the Y group first route, and the Y group second route are carried out by means of the Dijkstra method.

Preferably, the search of the X group second route and the search of the Y group second route are repeatedly carried out by means of the Dijkstra method.

Preferably, the shortest route having a shortest distance is searched by means of the Dijkstra method.

The plural-routes search method may further comprise the steps of grouping all sections connected to any node; and again carrying out the respective searches of the X group first route, the X group second route, the Y group first route, and the Y group second route, excluding the sections contained in the group, to acquire a roundabout route for the sections contained in the group.

Preferably, with respect to a plurality of routes of the searched X group second route and Y group second route, the number of times of use or a use time is registered as an attribute, to judge whether the plurality of routes are to be selected.

The above and other aspects, features and advantages of the present invention will become more apparent from the following detailed description of the embodiments in conjunction with the accompanying drawings.

BRIEF DESCRIPTION OF THE DRAWINGS

FIG. 6 is a representation showing a section information table;

FIG. 7 is a representation showing a node information table;

FIG. 8 is a representation showing a connection group table;

FIG. 9 is a representation showing a route information table after determined;

DESCRIPTION OF THE PREFERRED EMBODIMENTS

Figure 3:
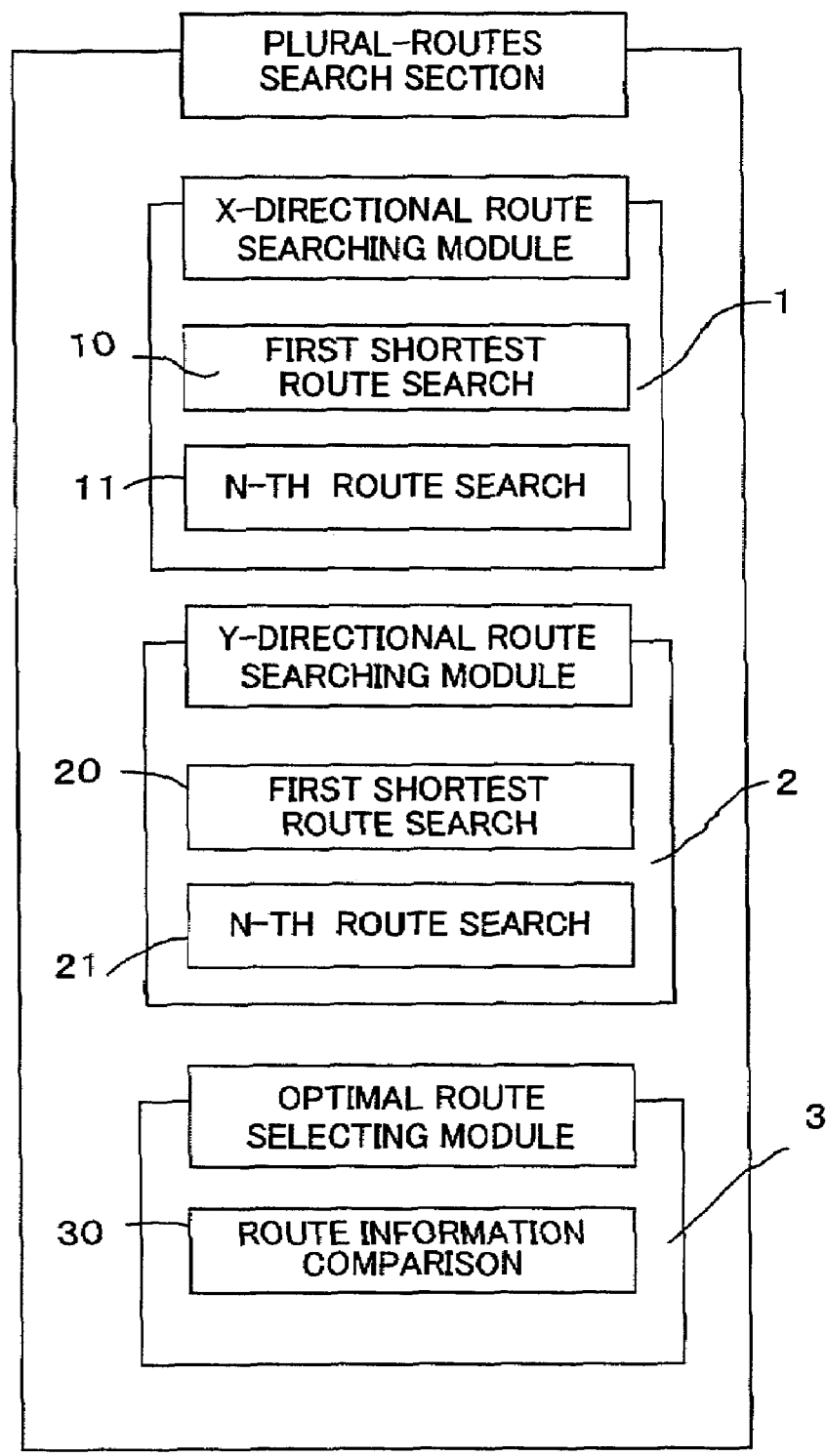
FIG. 3 is a diagram for explaining a program configuration which realizes a method for searching a route according to the present invention.

FIG. 3 is a diagram for explaining a system configuration which implements a method for searching a route according to the present invention.

This system has an X-directional route searching module 1, a Y-directional route searching module 2, and an optimal route searching module 3 as a plurality of route search sections. The respective modules are realizable by a software processing.

Hence, referencing a certain node, in the relation to a node adjacent to the certain node, it is defined that a section linking the adjacent node in a right-hand direction is an X direction, and a line linking in its inverse direction is a Y direction. And, assorting separately into the X and Y directions, the route is searched by the X-directional route searching module 1 and the Y-directional route searching module 2, respectively.

Figure 1:
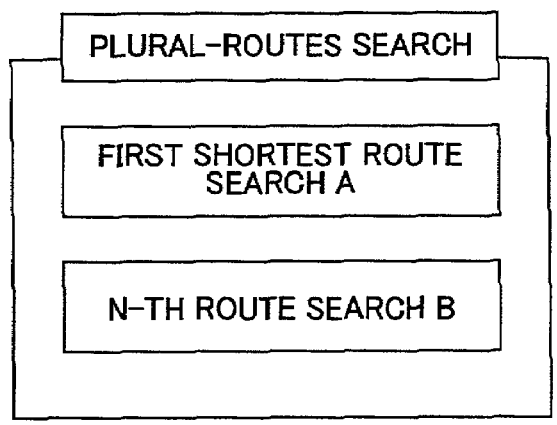
FIG. 1 is a diagram for explaining a concept of the Dijkstra method.
Figure 2:
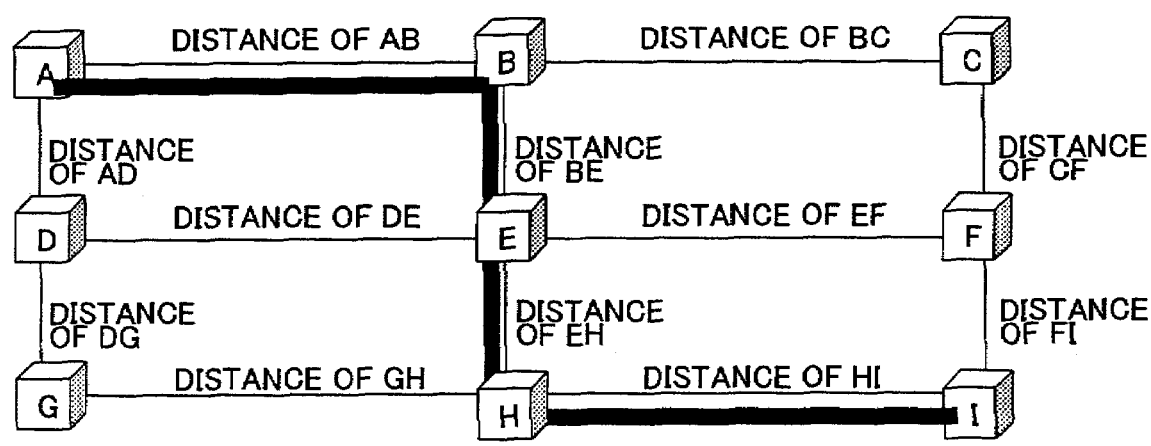
FIG. 2 is a view showing an example of a network.

Furthermore, each of the X-directional route searching module 1 and the Y-directional route searching module 2 performs first shortest route search processings 10, 20 subject to the conventional Dijkstra method shown in FIG. 1, and next performs n pieces of remaining route search processings 11, 21 except for the searched shortest route. Thus, it is possible to raise the probability of acquiring the plurality of optimal routes.

Figure 4:
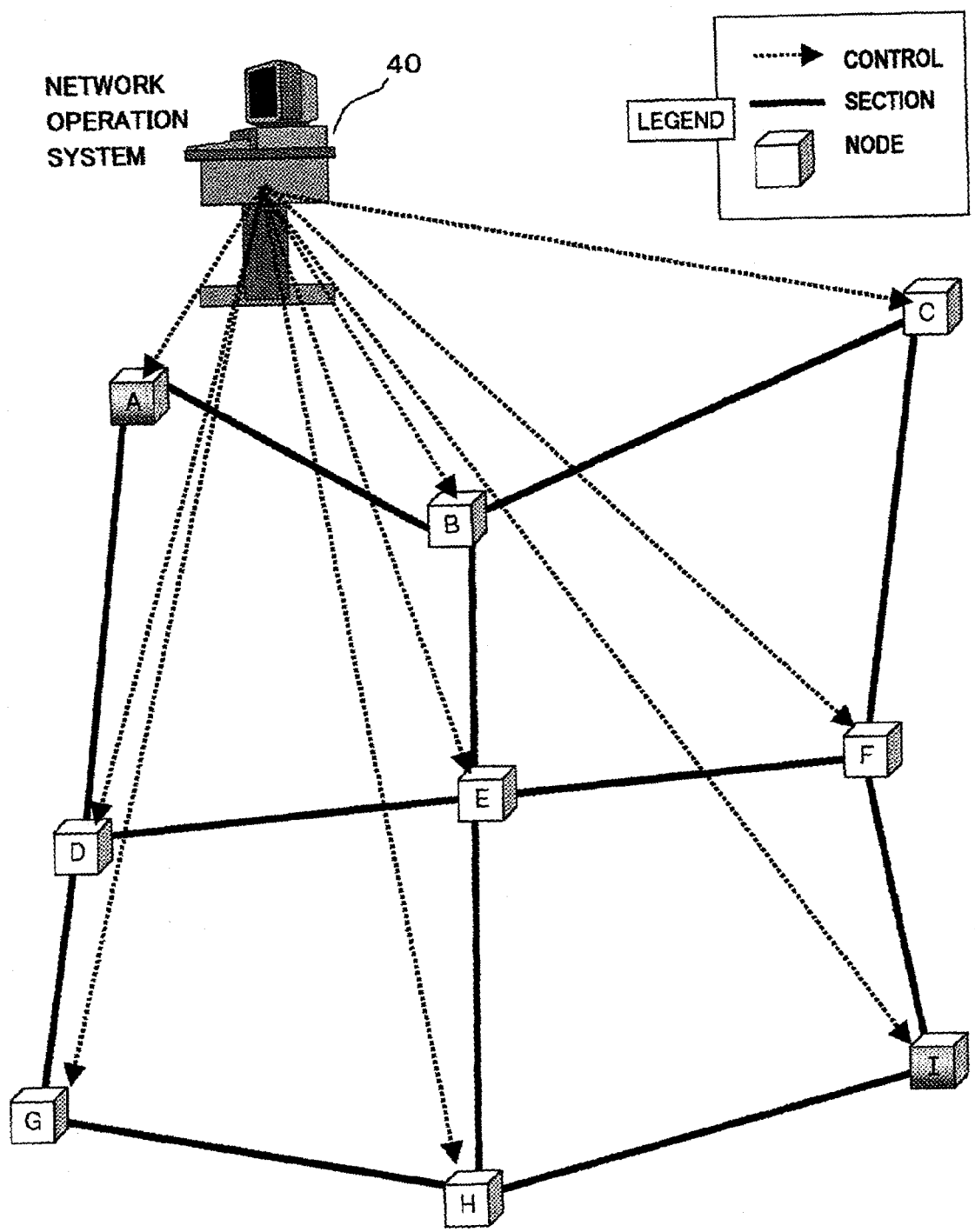
FIG. 4 is a view showing an embodiment in the case where the method according to the present invention is applied to a network operation system which controls and monitors a transmission line.

The optimal route module 3 has a function 30 of comparing route information (distance, cost, etc.) as an essential element between the route searched by the X-directional route searching module 1 and the route searched by the Y-directional route searching module 2. FIG. 4 is a view showing an embodiment in the case where the method according to the present invention is applied to a network operation system which controls and monitors a transmission line.

In FIG. 4, the plurality of nodes A to I configuring the network are respectively connected to one or more transmission lines, and have a function of switching their transmission lines. Each of the nodes A to I is connected to an operation system 40 for controlling and monitoring the whole network, and each node sets and switches the transmission line according to an instruction of this operation system 40.

Figure 5:
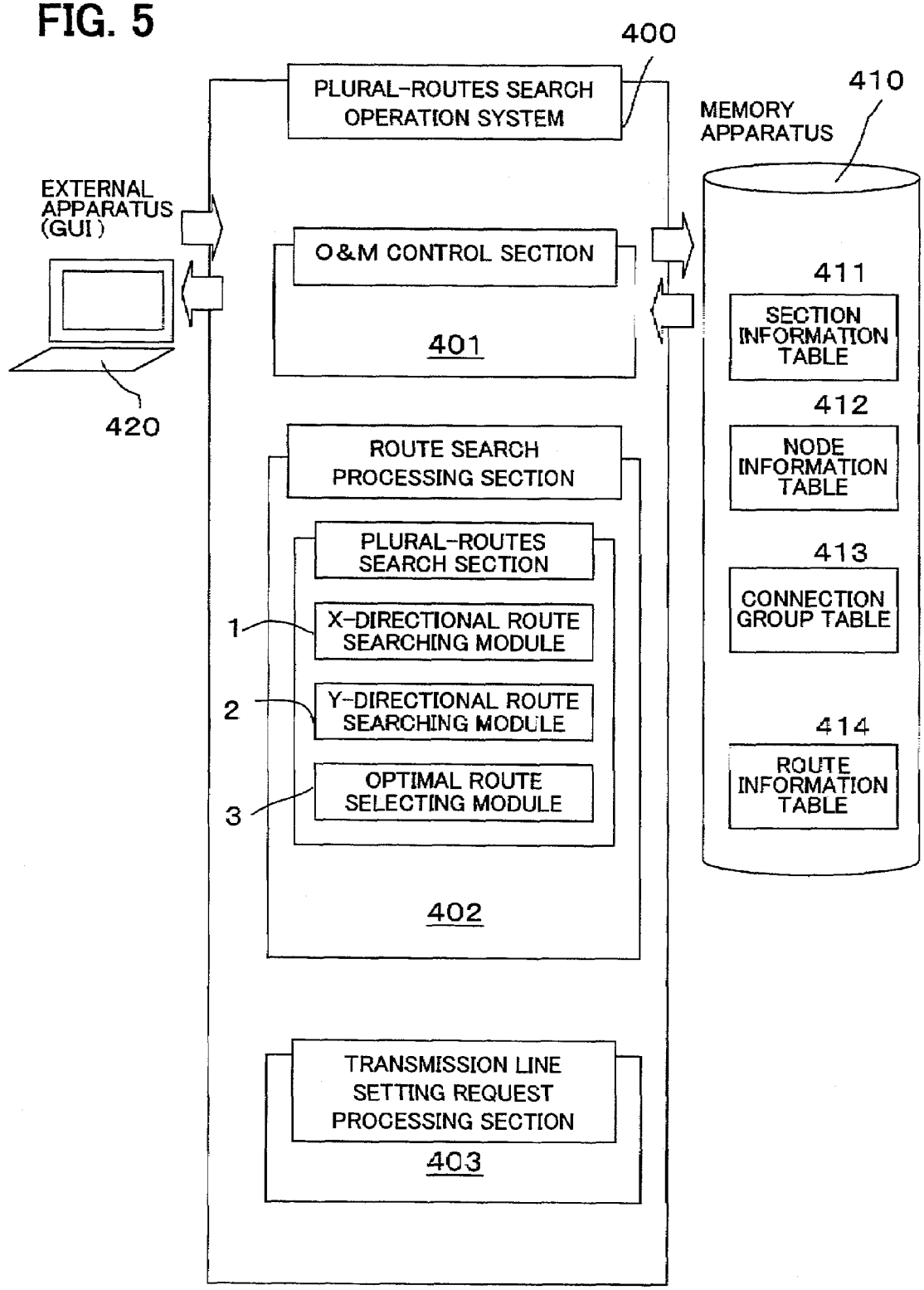
FIG. 5 is a configuration diagram of the operation system 40 according to the present invention in FIG. 4.

FIG. 5 is a system configurational diagram of the operation system 40 according to the present invention in FIG. 4.

The operation system 40 has a plural-routes search operation system 400 as a main body system, and transmits and receives data between a recording apparatus 410 for storing various information tables shown in FIGS. 6 to 9 and an external apparatus (GUI: Graphic User Interface) 420 having a GUI function.

The plural-routes search operation system 400 is further configured by the below function processing section. Each function section can be realized by software as described in FIG. 3.

(1) O&M control section 401: Mainly, an O&M control section 401 receives an instruction from a system operator in a part which controls a processing request and network status display by the external apparatus (GUI) 420.

(2) Route search processing section 402: A route search processing section 402 receives a processing request of a route search from the external apparatus (GUI) 420 through the O&M control section 401, and has a function of searching an optimal route based on end station data (node attribute data), transmission line data, or the like stored in a storing apparatus 410.

This route search processing section 402 is configured having the following sub-modules in the same manner as shown in FIG. 3.

(a) An X-directional route searching module 1
(b) A Y-directional route searching module 2
(c) An optimal route selecting module 3

(3) Transmission line setting request processing section 403: A transmission line setting request processing section 403 has a function of transmitting a setting request of the transmission line for realizing a route searched for each node configuring such route.

Figure 10:
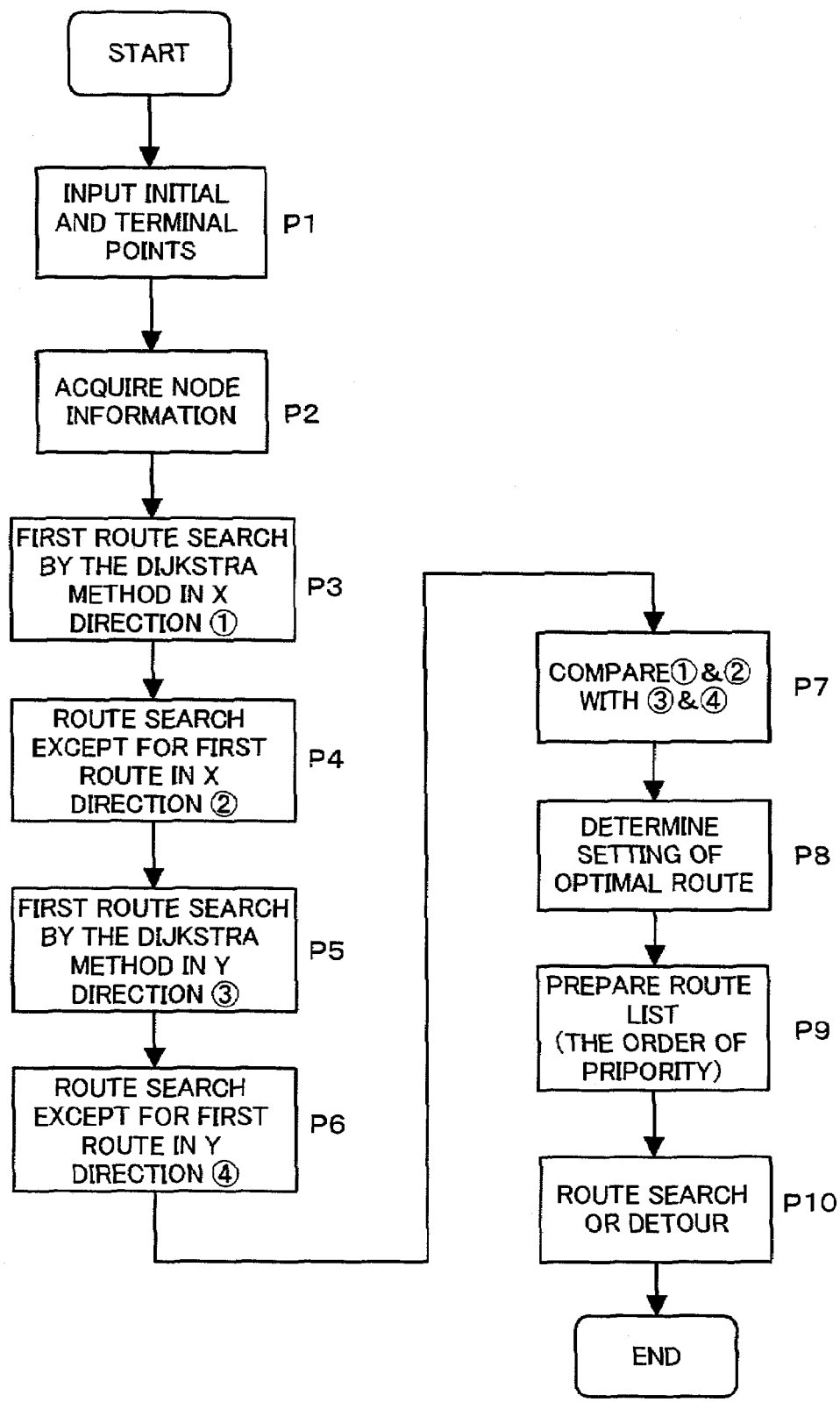
FIG. 10 is a flowchart showing operations of a route search section.

Next, a detailed operation of the operation system 400 according to the present invention will be further described based on a route search processing flow shown in FIG. 10 by exemplifying the network shown in FIG. 4.

The system operator utilizes the external apparatus (GUI) 420 of the system and selects an initial point node A and a terminal point node I to input (processing step P1). The O&M processing section 401 requests processings to the route search processing section 402 in order to search optimal routes of the node A and node I selected by the system operator.

Accordingly, the route search processing section 402 obtains information table data [section information data (FIG. 6), node information data (FIG. 7), connection group data (FIG. 8) and route information data (FIG. 9)] stored in the memory apparatus 410 exemplified in FIGS. 6 to 9 (processing step P2), and starts to search the optimal route.

Figure 11:
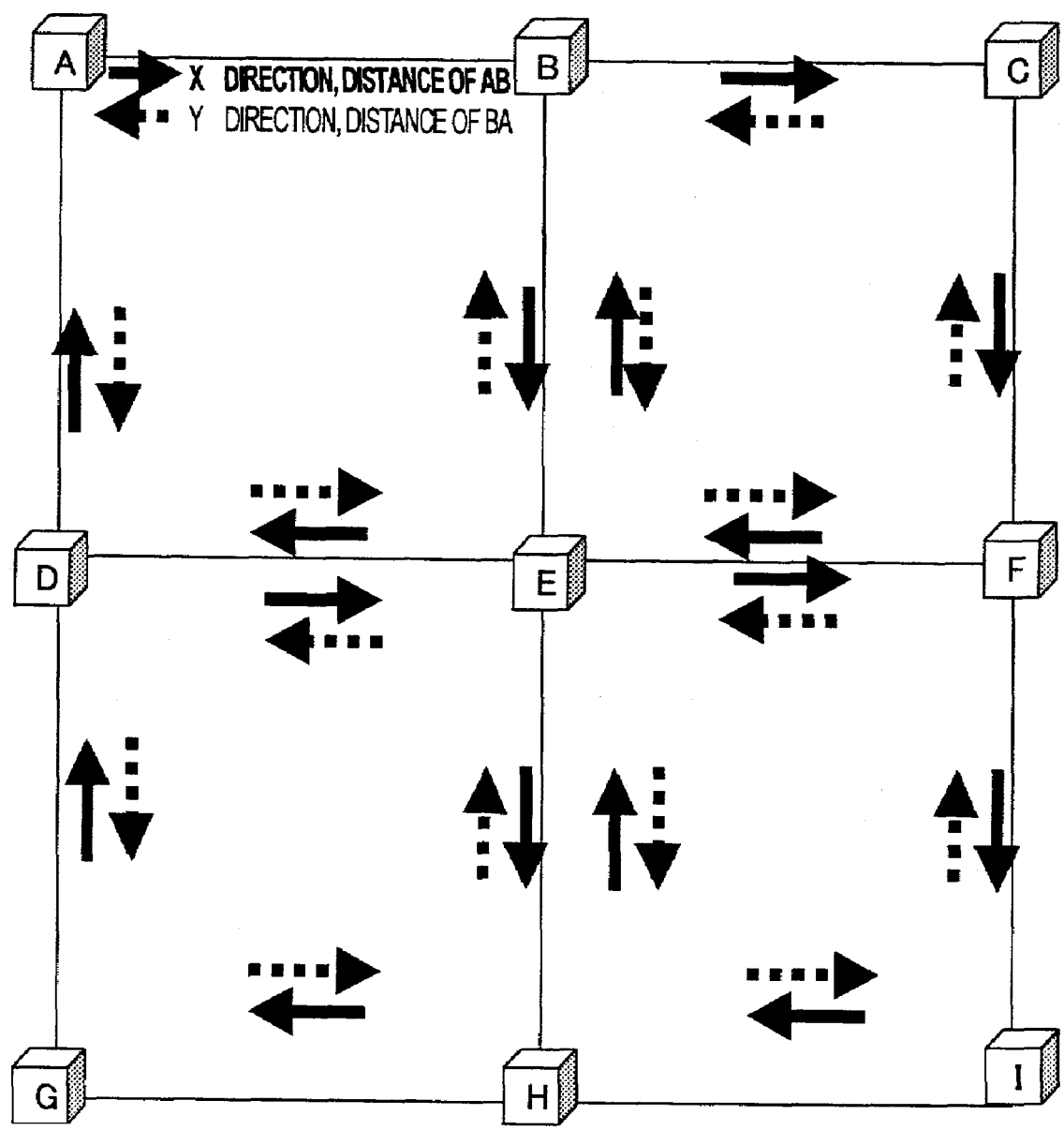
FIG. 11 is a view for explaining information with respect to sections between nodes A and I.

Initially, the following processings will be performed by the X-directional route searching module 1 in the route search processing section 402:

Here, for example, as information with respect to the section between the nodes A and I shown in FIG. 11, the following section information data have previously been registered in a section information table 411 shown in FIG. 6.

It is defined that a direction linking to a right-hand direction in the adjacent two nodes is an X direction (as shown by a solid line arrow in FIG. 11) and a direction linking to its inverse direction is a Y direction (as shown by a dotted line arrow in FIG. 11) (FIG. 6, Item 4).

Figure 12:
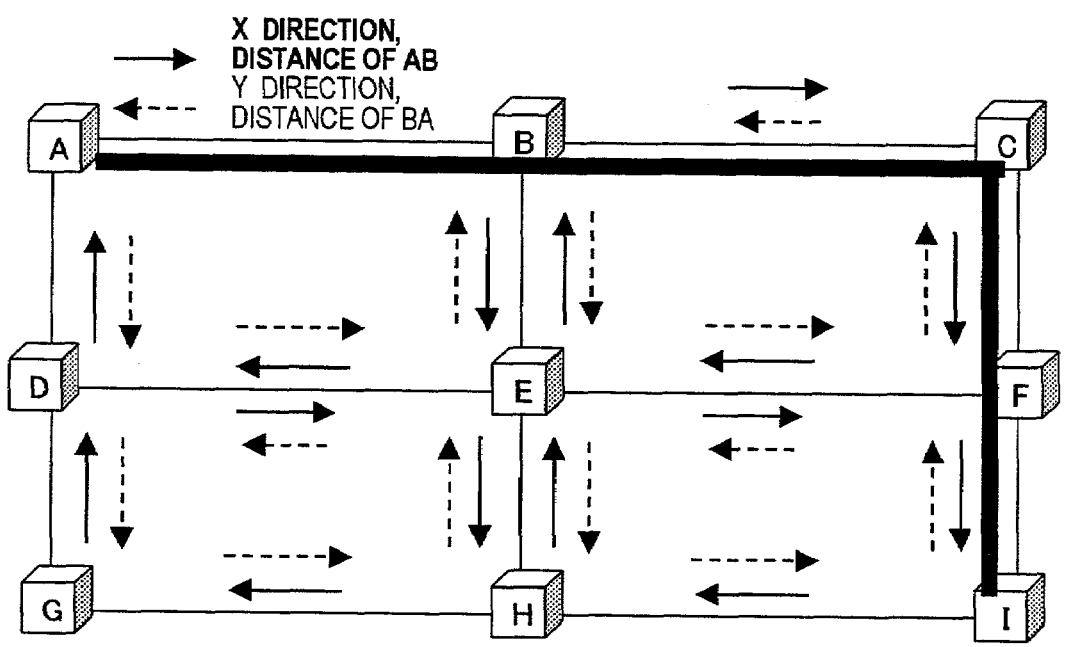
FIG. 12 is a view for explaining an X group first route.

A distance as an attribute (or a delay time relevant to the distance, etc.) is registered in the section information data of separate directions (FIG. 6, Item 3). First, only the X-directional element and attribute are an object and the shortest route ① from the initial node A to the terminal node I is searched by the Dijkstra method or the similar algorithm thereto (processing step P3). This route is called "an X group firs route" (refer to FIG. 12). In FIG. 12, in the case where the first route is acquired with only the X direction (for example, A B) as an abject, as the first route, the route A B C F I (to be shown by a bold solid line) can be taken.

Sequently, in the second search, the X-directional and Y-directional element and attribute are an object and further the element containing the passing node through "the X group first route" is not treated as an object. The shortest route from the same initial node A to the same terminal node I with the first search is searched by the Dijkstra method or the similar algorithm thereto (processing step P4). This route is called "an X group second route" (refer to FIG. 13).

Figure 13:
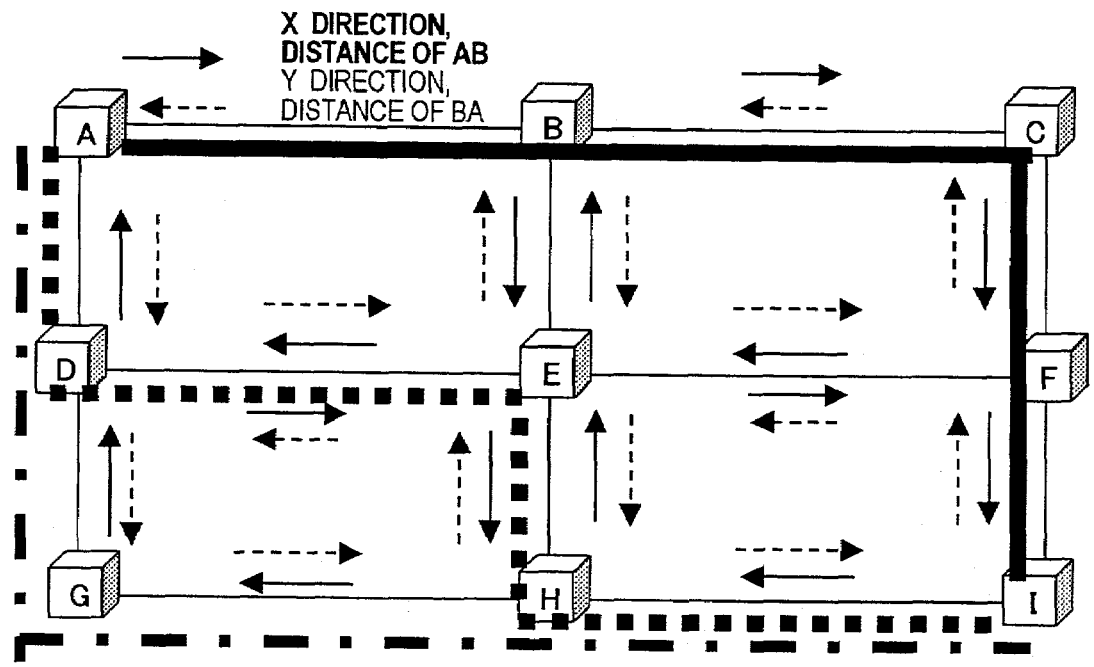
FIG. 13 is a view for explaining an X group second route.

The second route which does not pass the same node with the first route (shown by a solid line) of FIG. 12 is searched with either A D E H I (shown by a dotted line) or A D G H I (shown by a single-point chain line) in FIG. 13 being searched as "the X group second route."

Next, the following processing is performed by the Y-directional route search module 2 in the route search processing section 402.

At the first time, only the element and attribute of the Y direction are an object and the shortest route ③ from the same initial node A to the same terminal node I is searched by the Dijkstra method or the similar algorithm thereto (processing step P5).

Figure 14:
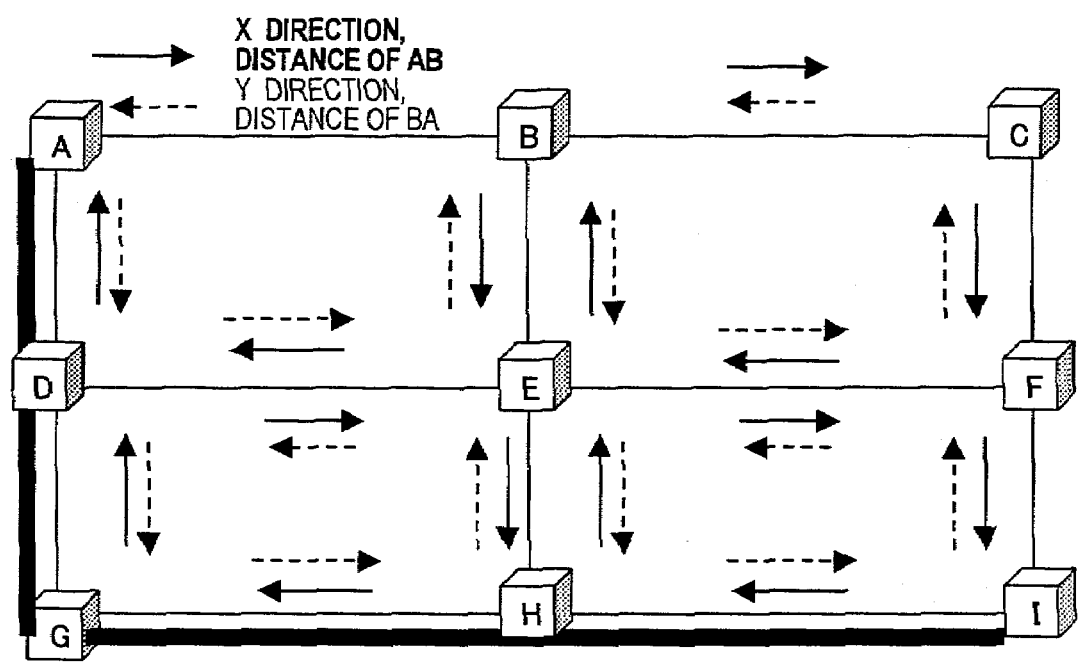
FIG. 14 is a view for explaining a Y group first route.

This route is called "a Y group first route" (refer to FIG. 14). In the case where the first route is acquired with only the Y direction (for example, B A) as an object, the first route is A D G H I (shown by a bold solid line).

At the second time, the elements and attributes of the X direction and Y direction are treated as an object and further the element containing the node by way of "the Y group first route" is not treated as an object. The shortest route from the same initial node A to the same terminal node I is searched by the Dijkstra method or the similar algorithm thereto (processing step P6). This route is called "a Y group second route" (refer to FIG. 15).

The second route which does not pass the same node as in the first route (shown by a bold solid line) of FIG. 14 is searched with either A B E F I (shown by a dotted line) or A B C F I (shown by a single-point chain line) as "the Y group second route".

Figure 15:
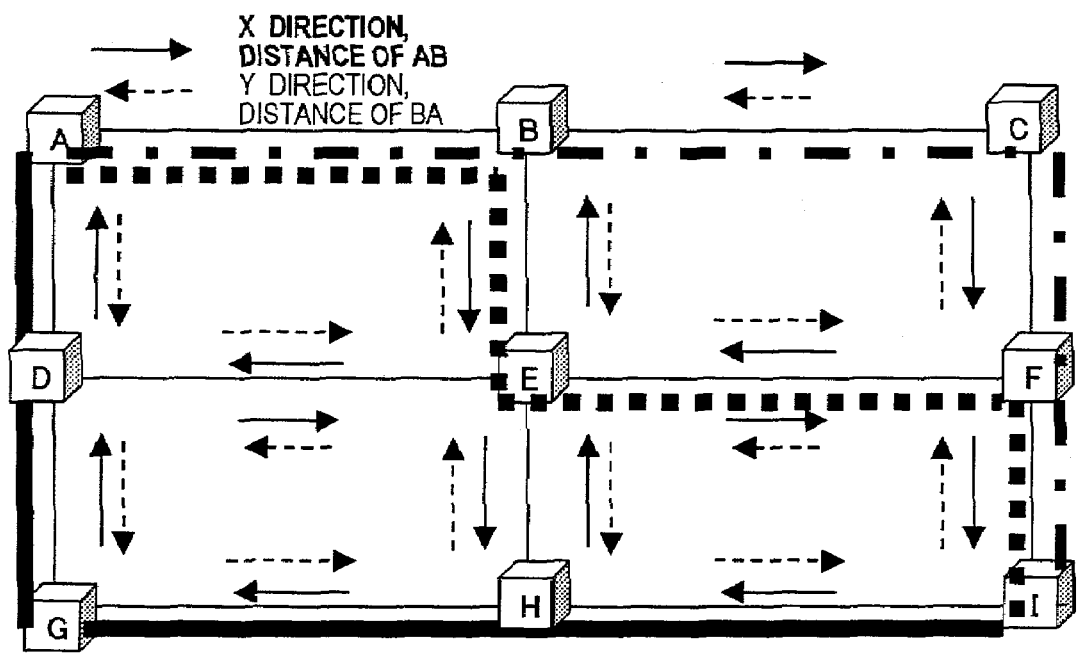
FIG. 15 is a view for explaining a Y group second route.

Here, further, when a different shortest route can be searched by the Dijkstra method or the similar algorithm thereto in the processing steps P4, P6 with the element containing the node by way of "the first route" and "the second route" being not treated as an object, by the X-directional route searching module 1 or the Y-directional route searching module 2 in the route search processing section 402, it is possible to call this route "a third route," and search the shorter route by repeating these processings (FIGS. 13 and 15 show two routes as a route searched in "the second route" and forward).

Furthermore, the following processings will be performed by the optimal route selecting module 3 in the route search processing section 402.

The total x of distances of "the X group first route" (FIG. 12) and "the X group second route" (FIG. 13) is compared with the total y of distances of "the Y group first route" (FIG. 14) and "the Y group second route" (FIG. 15) (processing step P7). A group in which the total distance is shorter is selected to determine (processing step P8).

Figure 16:
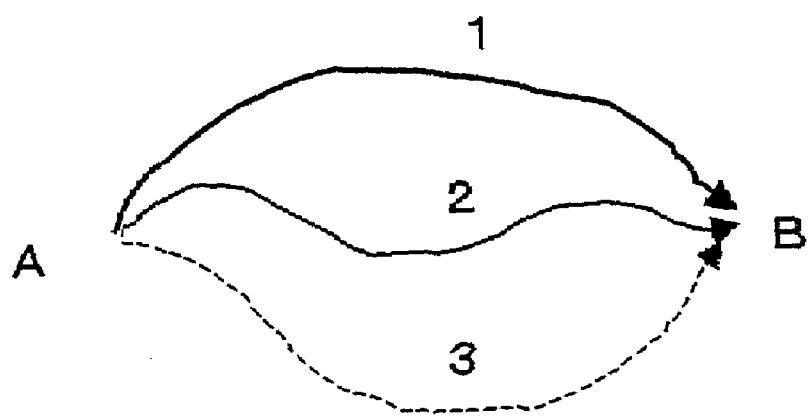
FIG. 16 is a view for explaining the order of priority of the route.

Furthermore, in the system to which the route search method of the present invention is applied, after "the X group" or "the Y group" is selected, the order of priority is affixed to a plurality of routes included in such group to provide the route in the order of priority. For example, as shown in FIG. 16, the order of priority of 1 to 3 is given to the three routes reaching from the node A to the node B.

Here, the order of priority is designated to distance, the number of time of use, use time, use amount, user name, user group name as the aforementioned attributes, or the arbitrary order of priority can be designated to the route. A route list is prepared in accordance with the order of priority with respect to the plurality of optimal routes (processing step P9).

Figure 17:
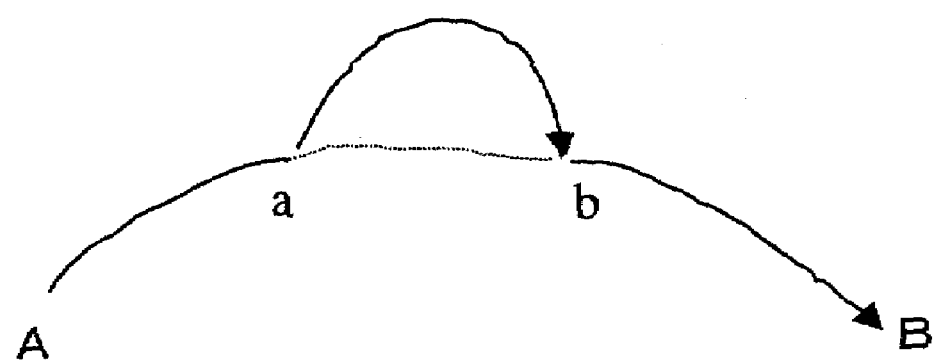
FIG. 17 is a view for explaining a roundabout connection of the route.

Subsequently, the optimal route searched by the route search processing section 402 is registered as information after determined in a route information table 414 shown in FIG. 9. And, in the transmission line setting request processing section 403, the optimal route is transmitted to each of the nodes A to I in the network shown in FIG. 4, and such route connection or roundabout connection is conducted to set the transmission line (processing step P10). Here, the roundabout connection can be explained in FIG. 17. In FIG. 17, in the case where a fault is present in the course of the route between the node A and the node B, a route between a node a and a node b is separated.

The aforementioned processing step can lead to a system which arranges a function of searching the plurality of routes which do not pass the same node in each group and can obtain a distance as short as possible. By such the method, it is possible to search and determine the plurality of routes which do not pass the same node from a certain initial node to a terminal node and can obtain a distance as short as possible.

For example, in FIG. 11, it is considered that the distance between the respective nodes has the following relation:

A-B: 1
B-C: 1
A-D: 1.5
B-E: 1
C-F: 1.5
D-E: 1.5

E-F: 1.5
D-G: 2.5
E-H: 2
F-I: 2.5
G-H: 2
H-I: 2

At this time, the distance of "the X group first route" (FIG. 12) is (1+1+1.5+2.5)=6. Furthermore, the distance of "the X group second route" (FIG. 13) is that a dotted line distance is equal to (1.5+1.5+2+2)=7 and a single-point chain line distance is equal to (1.5+2.5+2+2)=8. Accordingly, the total x of these distances is x=(6+7+8)=21.

On the other hand, the distance of "the Y group first route" (FIG. 14) is (1.5+2.5+2+2)=8. Furthermore, the distance of "the Y group second route" (FIG. 15) is that a dotted line distance is equal to (1+1.2+1.5+2.5)=6.2 and a single-point chain line distance is equal to (1+1+1.5+2.5)=6. Accordingly, the total y of these distances is x=(8+6.2+6)=20.2.

Thus, as the distance of the Y group is shorter, in the exemplified distance, the required route is selected in accordance with the order of priority from the plurality of routes (the three routes in the example of FIG. 15) of the group shown in FIG. 15.

Here, as an extension of the present invention, it is possible to provide various aspects as described below.

That is, in processing step P10 in an operational flow of FIG. 10, it is possible to beforehand designate whether to acquire how many kinds of route from the external apparatus (GUI) 420. In the case of not designating from the external apparatus (GUI) 420, in processing steps P4 and P6, a function capable of making a choice that routes as many as possible are searched is arranged, preferably.

In the case of being capable of searching only a string of route, in processing step P8, a function of notifying a warning to the external apparatus (GUI) 420 or the memory apparatus 410, and of recording it to provide a string of route is arranged. In the case of being entirely incapable of searching the route, a function of notifying the disable to search to the external apparatus (GUI) 420 or the memory apparatus 410 and of recording it is arranged.

In a comparison processing in processing step P7, it is possible to use the attribute registered separately in place of the aforementioned distance with respect to the element as the section of each direction. As the static attributes except for the distance, the examples contain an object/non-object identifier (FIG. 6, Item 5), a usable time band (FIG. 6, Item 6), a user name (FIG. 6, Item 7), and a user group name (FIG. 6, Item 8). These static attributes are an object that the use in a construction, etc. is generally regulated, and are displayed, changed and recorded by the external apparatus (GUI) 420.

The dynamic attributes except for the distance contain the number of times of use (FIG. 6, Item 9), a use time (FIG. 6, Item 10), a use amount (band capacity) (FIG. 6, Item 11), and fault information (FIG. 6, Item No. 12).

Such the dynamic attributes are an object that the use in a fault, etc. is regulated, to automatically update, record, and display by the external apparatus (GUI) 420. Furthermore, a function of changing to the section information table 411 shown in FIG. 6 and recording is arranged in the O&M control section 401.

For example, in processings of processing steps P3 to P6, with respect to the element of a line of each direction in X and Y directions, a function of being simultaneously capable of registering a plurality of kinds of attribute is arranged.

Thus, in processing steps P3 to P6, it is possible to search the route by comparing according to the plurality of kinds of attribute.

Furthermore, the attributes are registered in the section information table 411 with respect to the elements as the nodes (refer to FIG. 6). For example, the number of times of use is registered as the attribute with respect to the element as the node (FIG. 6, Item 9), and the number of times of use is updated and recorded in the node included in the route selected finally. Furthermore, it is possible to arrange also a function of registering a certain attribute in place of the number of times of use.

The static attributes except for the number of times of use contain an object/non-object identifier (FIG. 7, Item 4), a usable time band (FIG. 7, Item 5), a user name (FIG. 7, Item 6), and a user group name (FIG. 7, Item 7). The static attributes are controlled in displaying, changing and recording by the external apparatus (GUI) 420.

The dynamic attributes except for the number of times of use contain a use time (FIG. 7, Item 8), a use amount (FIG. 7, Item 9), and fault information (FIG. 7, Item 10). The dynamic attributes are controlled in displaying, changing and recording by a function of automatically updating and recording and the external apparatus (GUI) 420.

Furthermore, in processing steps P3 to P6, a function of judging the static attributes registered with respect to the element such as the section or the node and not treating the elements as an object of the route search is provided. That is, in the case where they cannot be used by a construction, etc., they are not treated as the route search.

Furthermore, a function of registering a warning value is arranged for the dynamic attributes with a fault, etc. as an object which are registered with respect to the element such as the section or the node. When the warning value is exceeded, a function of warning that the warning value is exceeded to record it is provided.

A function of registering a regulation value (a reference that the element is not treated as the route search) is arranged in the dynamic attribute registered with respect to the element such as the section or the node (FIG. 6, Item 26). And, in processing steps P3 to P6, a function of notifying and recording that the regulation value is exceeded after the regulation value is exceeded and of not treating the element as an object of the route search is arranged.

The roundabout connection processing in the aforementioned processing step P10 is a function of, when the route cannot be used, selecting whether to substitute automatically the route. Alternatively, after the route has already been provided and when a certain node or section cannot be used, the route is detoured.

In this case, as one example, in the case where the roundabout route with respect to nodes a-b in the course of the route between A and B is searched as shown in FIG. 17, it is possible to search the roundabout route as the initial node a and the terminal node b in accordance with the flow of FIG. 10 explained above. At this time, in processing steps P3 to P6, the unusable node or section (a dotted line route section linking the node a with the node b in FIG. 17) is not treated as an object of the search. Subsequently, the starting node a and the ending node b of an unusable part in the course of the route are designated as an initial node and a terminal node, to search the roundabout route for realization.

At this time, in the case where the roundabout route cannot be searched, a node prior to an unusable part (a node between the node A and the node a in FIG. 17) is set as an initial node, and a node after the unusable part (a node between the node b and the node B in FIG. 17) is set as a terminal node, and the roundabout route is again searched. As the results of the search, the roundabout route is displayed and recorded in the external apparatus (GUI) 420.

Furthermore, in processing step P10, it is possible to select whether or not the unusable part is changed into the roundabout route. Alternatively, it is possible to select whether or not the roundabout is returned to an original route.

Furthermore, a function of registering a certain node and a line linking to the node as "a connection group" is arranged (refer to the connection group table 413 shown in FIG. 8). For example, as the connection group, a group, etc. like the Kanto area in Japan are present. In this case, in the case where it is desired that the node as the element in the connection group is not treated as an object, all the sections included in "the connection group" are not treated as an object of the route search. The node is designated from the external apparatus (GUI) 420, whereby it is possible to select whether or not "the connection group" is treated as an object of the route search. And, in the case where "the connection group" is not treated as an object, it is possible to search the roundabout route with respect to such "the connection group" which is not treated as an object.

As set forth hereinabove in the embodiment of the present invention in conjunction with the drawings, it is possible to provide the route search method which raises the probability of searching the plurality of routes as optimal as possible without passing the same node, and the network apparatus to which the same is applied.

What is claimed is:

1. A method of searching a plurality of routes linking from an initial node to a terminal node in a network linking a plurality of nodes, comprising the steps of:
    defining an X direction, which is a section linking a certain node to an adjacent node in a right-hand direction, and defining a Y direction, which is a line linking the certain node to the adjacent node in a left-hand direction, while referencing the certain node;
    specifying an initial node and a terminal node;
    searching a first route of the shortest distance between the initial node and the terminal node connected via nodes to transmission lines having only X directional elements and attributes, with the first route being set as an X group first route;
    searching a second route of the shortest distance between the initial node and the terminal node connected via nodes to transmission lines having X directional and Y directional elements and attributes, respectively, excepting the nodes on the X group first route, with the second route being set as an X group second route;
    searching a third route of the shortest distance between the initial node and the terminal node connected via nodes to transmission lines having only Y directional elements and attributes, with the third route being set as a Y group first route;
    searching a fourth route of the shortest distance between the initial node and the terminal node connected via nodes to transmission lines having X directional and Y directional elements and attributes, respectively, excepting the nodes on the Y group first route, with the fourth route being set as a Y group second route;
    comparing a sum of distances on the X group first route and on the X group second route with a sum of distances on the Y group first route and on the Y group second route; and
    determining a group having a smaller sum as an optimal route in the comparison.

2. The method according to claim 1, wherein respective searches of the X group first route, the X group second route, the Y group first route, and the Y group second route are carried out by means of the Dijkstra method.

3. The method according to claim 2, wherein the search of the X group second route and the search of the Y group second route are repeatedly carried out by means of the Dijkstra method.

4. The method according to claim 3, wherein with respect to a plurality of routes of the searched X group second route and Y group second route, the number of times of use or a use time is registered as an attribute, to judge whether the plurality of routes are to be selected.

5. The method according to claim 1, wherein each of the first through fourth routes of the shortest distance is searched by means of the Dijkstra method.

6. The method according to claim 1, further comprising the steps of:
    grouping all sections connected to any node; and
    again carrying out the respective searches of the X group first route, the X group second route, the Y group first route, and the Y group second mute, excluding the sections contained in the group, to acquire a roundabout route for the sections contained in the group.

7. A network searching apparatus for searching a plurality of routes linking from an initial node to a terminal node in a network, which links a plurality of nodes, the apparatus comprising:
    a data base for storing information data on the plurality of nodes and on sections linking adjacent nodes, with definition of an X direction, which is a section linking a certain node to an adjacent node in a right-hand direction, and with definition of a Y direction, which is a line linking the certain node to the adjacent node in a left-hand direction, when referencing the certain node; and
    a plural-routes search operation system having a route search processing function, the route search processing function including,
    an X directional mute searching module, which specifies the initial node and the terminal node, the X directional route searching module searching a first route of the shortest distance between the initial node and the terminal node connected via nodes to transmission lines having only X directional elements and attributes to set the first route as an X group first route, and searching a second route of the shortest distance between the initial node and the terminal node connected via nodes to transmission lines having X directional and Y directional elements and attributes, respectively, excepting the nodes on the X group first route, to set the second route as an X group second route,
    an Y directional route searching modules which searches a third route between the initial node and the terminal node connected via nodes to transmission lines having only Y directional elements and attributes to set the third route as a Y group first route, and searching a fourth route of the shortest distance between the initial node and the terminal connected via nodes to transmission lines having X directional and Y directional elements and attributes, respectively, excluding the nodes on the Y group first route, to set the fourth route as a Y group second route, and
    an optimal route selection module which compares a sum of distances on the X group first route and on the X group second route with a sum of distances on the Y group first route and on the Y group second route, to determine a group having a smaller sum in the comparison as an optimal route.

8. The network searching apparatus according to claim 7, wherein all sections connected to any node are grouped, and the respective searches of the X group first route, the X group second route, the Y group first route, and the Y group second route are searched excluding the sections contained in the group, to acquire a roundabout route for the sections contained in the group.

9. The network searching apparatus according to claim 7, wherein respective searches of the X group first route, the X group second route, the Y group first route, and the Y group second route are carried out by means of the Dijkstra method.

10. The network searching apparatus according to claim 9, wherein the search of the X group second route and the search of the Y group second route are repeatedly carried out by means of the Dijkstra method.

11. The network searching apparatus according to claim 10, wherein with respect to a plurality of routes of the searched X group second route and Y group second route, the number of times of use or a use time is registered as an attribute, to judge whether the plurality of routes are to be selected.

12. The network searching apparatus according to claim 9, wherein each of the first trough fourth routes of the shortest distance is searched by means of the Dijkstra method.

* * * * *